United States Patent [19]

Profit

[11] 3,973,611
[45] Aug. 10, 1976

[54] NUT SYSTEM FOR LIMITING TIGHTENING
[75] Inventor: Christian Profit, Bordeaux, France
[73] Assignee: Saft-Societe des Accumulateurs Fixes et de Traction, Romainville, France
[22] Filed: Feb. 24, 1975
[21] Appl. No.: 552,615

[30] Foreign Application Priority Data
  Mar. 1, 1974  France .............................. 74.07080

[52] U.S. Cl. ................................. 151/19 A; 85/61
[51] Int. Cl.² ......................................... F16B 39/36
[58] Field of Search ............. 151/19 A, 19 R; 85/61

[56] References Cited
UNITED STATES PATENTS
| 1,020,178 | 3/1912 | Battin | 151/19 A |
|---|---|---|---|
| 2,125,323 | 8/1938 | Tarwater | 151/19 A |
| 2,374,266 | 4/1945 | Barr | 151/19 A X |
| 2,412,409 | 12/1946 | Martin | 151/19 A |
| 2,529,854 | 11/1950 | Tarwater | 151/19 A |
| 3,511,289 | 5/1970 | Coyle | 151/19 A |

Primary Examiner—Ramon S. Britts
Attorney, Agent, or Firm—Kenyon & Kenyon Reilly Carr & Chapin

[57] ABSTRACT

The invention concerns a nut system comprising a nut connected with a nut lock constituted by a washer having the same inside diameter as the nut. In such a system, the nut and the washer are tied together while remaining rotatable relative to each other and capable of assuming a first relative position in which they are coaxial and a second relative position in which they are eccentric, thus becoming tightened in the eccentric position.

9 Claims, 4 Drawing Figures

NUT SYSTEM FOR LIMITING TIGHTENING

BACKGROUND AND BRIEF SUMMARY OF INVENTION

The invention relates to a nut system which is self-jamming at the time of tightening. A problem arises when a nut screwed onto a threaded rod clamps an easily deformable or fragile part. In such a case, a torque wrench which exerts only a strictly limited effort on the surface of the part is generally used. But in the case of accidental dismantling, a special wrench is not always available for re-assembly and in any case, such wrenches are expensive tools. The aim of the present invention is to overcome these drawbacks and to produce a nut system comprising a nut lock capable of locking the latter at any level of the threaded rod without requiring the use of special tools such as a torque wrench.

Self-locking nut systems of various kinds are known in the art as, for example, the system shown in British Pat. No. 520,537 of Apr. 26, 1940. However, such known systems require use of special tools such as a torque wrench and thus do not eliminate the problems hereinabove set forth.

This invention has among its objects a nut system which is self-blocking or jamming at the required time of tightening which eliminates the foregoing problems and which is composed of a nut and a nut lock element constituted by a non-threaded washer, characterized in that the nut and the washer are tied together while being rotatable relative to each other on a surface of revolution, the washer being situated adjacent the face of the nut pointing in the direction of the tightening and wherein the axes of the bores of the nut and of the washer are not coaxial with the axis of the surface of revolution.

In this way, at the beginning of the screwing of the nut onto a threaded rod, the nut and the washer whose axes and bores coincide will rotate together. When the washer comes into contact with the surface on which the nut is to be clamped, the friction of the washer on that surface prevents it from rotating while the nut continues to rotate. Thus, the two parts rotate relative to each other about the axis of the surface of revolution. The two axes of the bores of nut and washer cease to coincide and thus the washer is clamped or jammed securely against the screw, thus causing the locking or jamming of the system.

According to an embodiment of the invention which constitutes advantageous features, the said surface of revolution is generally conical widening in the direction of the tightening. The washer is thus joined rotatably at that surface.

To make the unscrewing of the system easier, it is preferable to increase the friction between the washer and the nut at their engagement at their coinciding surfaces of revolution in order to promote the concurrent driving of the washer by the nut during screwing onto the threaded rod at which time the axes of their bores coincide. For that purpose, it is possible, for example, to insert an elastic part between the neighboring or juxtaposed faces of the nut and of the washer, which part presses the coinciding surfaces of revolution of the washer and of the nut against each other. This elastic part may assume various forms. It may be in the form of a wire spring made of an elastic material or of a cambered ring of the type known as a "Belleville" ring. It may also be made of an elastomer, for example, in the form of a torus. In such case, the washer will preferably be made of a plastic material.

The invention will be better understood on referring to the examples illustrated hereinbelow and the accompanying drawings, in which.

DETAILED DESCRIPTION

Figure 1:
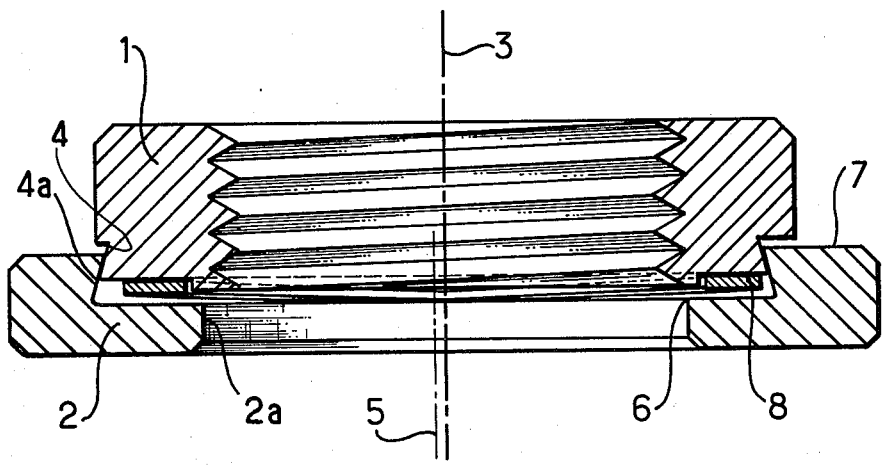
FIG. 1 is a vertical sectional view of an embodiment of the nut system according to the invention.

Referring to the drawing, in FIG. 1, the reference 1 designates the threaded nut and the reference 2 designates the washer.

The face of the nut located in the direction of the tightening is shown in the figure as its bottom face. The axis of the bore of the nut has been materially represented by the dot-dash straight line 3. It is also the axis of symmetry of the top part of the nut whose cross-section is a regular polygon at its periphery, as usual. On the other hand, at the bottom part, a conical surface 4, slightly recessed with respect to the top part and opening downwards is provided up to a height which may be equivalent to a quarter of the total height of the nut. The conicity of that surface is preferably not very marked for reasons which will become apparent later, the half angle at the top being, for example, in the order of 10° to 20°. The axis of the said conical surface, however, does not merge with the axis of the bore but is offset eccentrically and is represented by the dotted line 5. The eccentricity must be slight, being of the order of 1 millimeter or even less.

The washer 2 comprises a non-threaded bore 2a which has the same diameter as the diameter at the bottom of the thread of the nut. Its top face is provided with a central part 6 recessed in relation to the peripheral part 7. These two parts 6 and 7 are joined together by a conical surface 4a which corresponds to the conical surface 4 of the nut in such a way that the two conical surfaces 4 and 4a coincide together when the two parts are inter-fitted, the central part 6 of the top face of the washer then lying opposite the bottom face of the nut. The angle of the conical surfaces is slight so that the inter-fitting of the nut and the washer may be effected without difficulty.

There is the same eccentricity between the axis of the bore of the washer and the axis of its conical surface as provided between the axis of the bore of the nut and the axis of the conical surface 4, so that there is a position in which the two axes of the bores of the nut and of the washer fitted over it coincide.

A metallic spring 8 which is shown here as a cambered ring of the type known as a Belleville ring, is arranged between the juxtaposed faces of the nut and of the washer. The spring could also be an elastic wire bent in the form of an arc of a helix.

The operation of the system is as follows: the axes of the bores of the nut and of the washer are brought into a coinciding position and the system is then screwed without difficulty onto a threaded rod having threads corresponding to the nut. When the bottom face of the washer comes into contact with the surface of the part against which the nut is to be tightened (for example, a seal) it ceases to rotate because the friction of its bottom face against the said part becomes greater than the friction between the two conical surfaces which tend to separate in axial direction and no longer be in contact with each other because a slight axial movement of the washer occurs bringing the nut and the washer closer to each other. The nut then continues to rotate, the two axes of the bores no longer coincide and the washer and the nut are jammed on the threaded rod. That blocking or jamming is effected in a small fraction of a turn of the nut and so avoids damage to the part against which the washer bears, since it is obtained without need for any excessive tightening of the nut.

Unscrewing is effected without difficulty, the washer being once again driven by the nut when the rotating of the nut in the reverse direction (unscrewing direction) will have brought the axes of the bores into the coinciding position. Indeed, upward movement of the nut in unscrewing rotation releases the pressure of the washer on the surface of the part to be clamped and re-establishes the close contact between the conical surfaces 4 and 4a. In this way, the friction of the washer and the nut between the conical surfaces becomes greater than that of the washer against the part, that action being favoured by the spring 8.

It should be observed that the peripheries of the nut and of the washer as well as their bores may be of conventional dimensions, the eccentric conical surfaces according to the invention being situated between the peripheries and the bores of the nut and of the washer.

Figure 2:
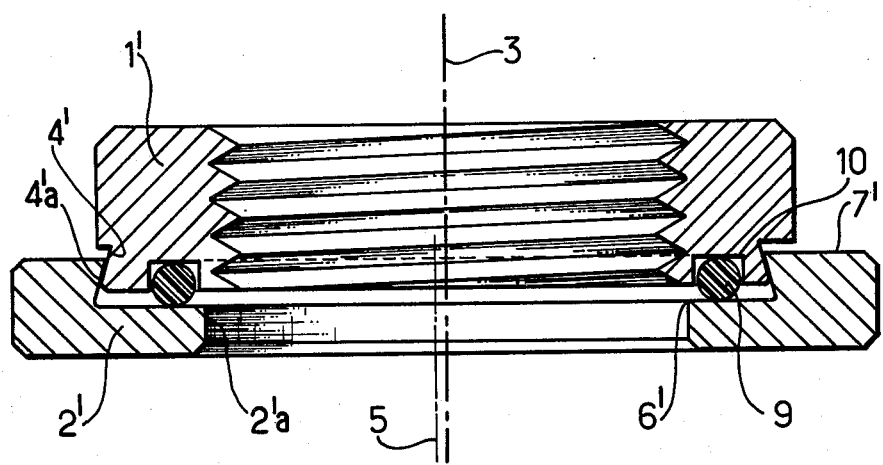
FIG. 2 is also a similar view of another embodiment of the nut system according to the invention.

FIG. 2 shows a similar system with like parts bearing primed reference characters corresponding to similar parts in FIG. 1, but the metallic spring 8 has been replaced by an O-ring or torus 9 made of an elastomeric material for which a recess 10 has been provided on the bottom face of the nut 1. In this case, the washer is preferably made of a relatively rigid plastic polymer material such as A B S. In the alternative, the 9 may be replaced by a spiral spring located in recess 10.

The arrangement of FIG. 2 is suitable especially for nuts having small dimensions.

Figure 3:
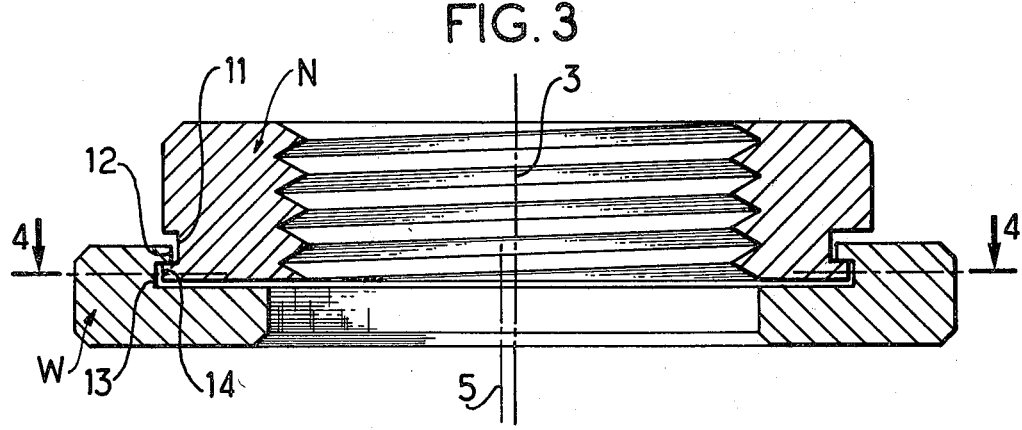
FIG. 3 is a section along line 3—3 of FIG. 4 of a further embodiment.
Figure 4:
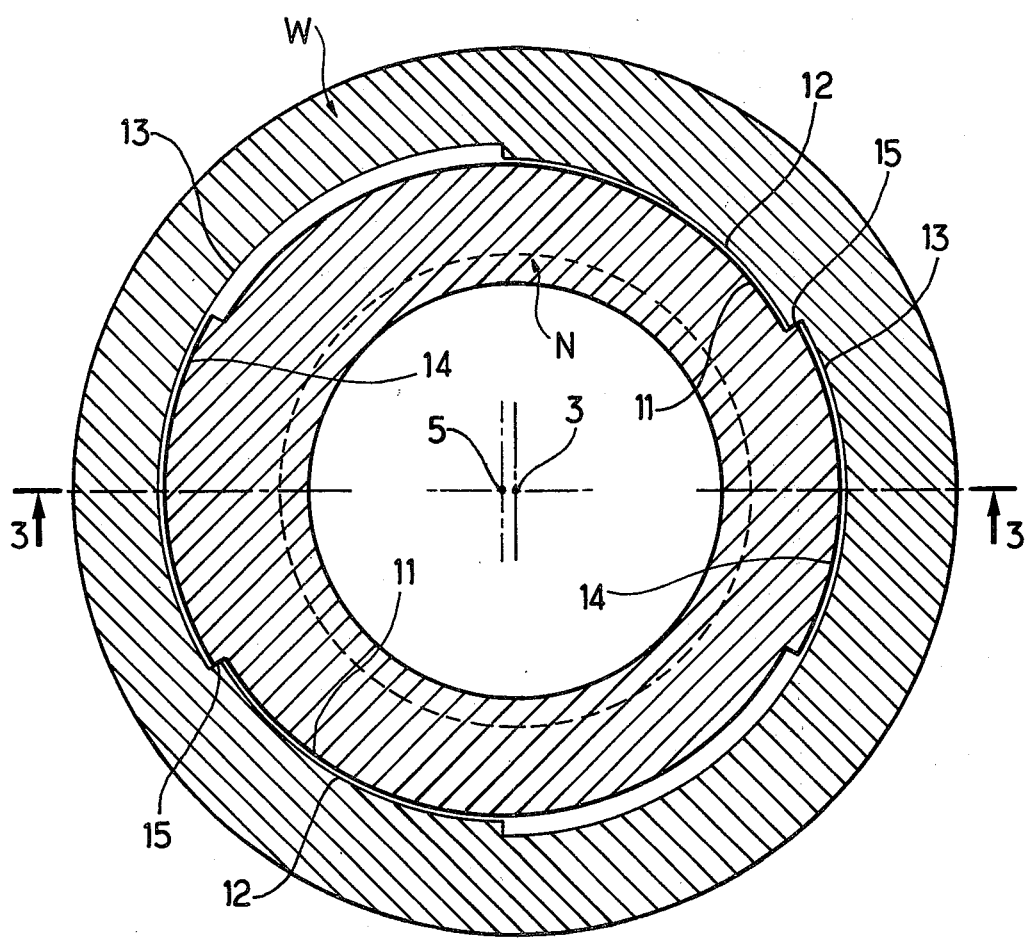
FIG. 4 is a section along line 4—4 of the embodiment of FIG. 3.

It must be understood that the examples which have just been described are not intended as having limiting character and numerous variants could be made as embodiments of the system. Thus, the spring may be omitted as is shown in the embodiments of FIGS. 3 and 4. As seen in FIGS. 3 and 4, the longitudinal surface of revolution which effects the rotation of the nut N and the washer W when their axes coincide, is a cylinder defined by the opposing faces 11 of nut N and 12 of washer W. A two-part groove 13 is cut into the face 12 of the washer. These two parts are symmetrical and concentric with the axis 5. The two parts of the groove 13 are separated by two symmetrical uncut portions of the cylindrical face 12 of said washer. A pair of projections are provided in the surface 11 of nut N in the form of diametrically located radially outwardly extending rib portions 14. These rib portions are also symmetrical and concentric with respect to axis 5 and are movable in the respective parts of groove 13 of the washer, but are of less width than said groove parts so that relative rotation of approximately up to 60° may occur between the nut N and washer W. It is then possible to ensure that the nut effectively drives the washer at the time of coincidence of the axes by the groove and projection system because each stud or rib 14 comes to the end 15 of a part of the groove 13 at the time of the coincidence of the bores and thus, the washer is driven.

The ribs 14 may, if desired, be replaced by one or a plurality of studs associated with an equal number of groove parts.

In order to permit assembly of the nut N and washer W two cut outs of the same depth as the parts of groove 13 may be provided above the parts of said groove 13 whose lengths are at least equal to those of ribs 14 but less than the lengths of said groove parts.

It is also possible to provide a spiral spring fixed at its opposite extremities respectively to the nut N and washer W which tend to maintain them against each other when the two axes coincide. Such spring can be lodged in a groove similar to the groove 10 of FIG. 2. This ameliorates the convenience of using the system by maintaining coincidence of the two axes pending mounting of the nut and washer on the threaded rod. Moreover, it avoids accidental disassembly of the nut and washer prior to use and also during its manipulation.

While specific embodiments of the invention have been shown and described, other variants within the scope of the appended claims are possible and are contemplated. There is no intention, therefore, of limitation to the exact description and showings hereinabove presented.

What is claimed is:

1. Nut system which is self-locking at the required time of tightening on a threaded stud comprising a nut having a threaded bore adapted to be screwed onto the stud, a nut lock constituted by a washer having a non-threaded bore of greater diameter than the stud, said nut and washer being joined together for relative rotation with respect to each other and having interengaged surfaces of revolution that are rotatable relative to each other on said surfaces of revolution, said washer being situated axially on that face of the nut facing the direction of tightening on the stud, the axes of the bore of said nut and washer being offset relative to a common axis of said surfaces of revolution, an elastic part positioned between adjacent facing surfaces of the nut and washer tending to bias them apart in an axial direction so as to maintain frictional surface contact between the said surfaces of revolution whereby the nut and washer will rotate together in unison during tightenrotation of the nut on said stud, said washer being retainable against rotation on said stud, whereby when so retained a further minimal rotation of said nut in tightening direction on said stud effects relative rotation of said surfaces of revolution with respect to each other and thereby effects a lateral offset of the axis of said bores relative to the common axis of said surfaces of revolution and the exertion of a tightening lateral pressure of the nut against said stud to lock it in place thereon.

2. Nut system according to claim 1, characterized in that the said surfaces of revolution are frusto-conical widening in the direction of the tightening.

3. Nut system according to claim 1, characterized in that the said surfaces of revolution are a cylinder.

4. Nut system according to claim 1 including a projection and a groove provided respectively on the said nut and washer in their contacting surfaces of revolution.

5. Nut system according to claim 1 wherein the elastic part is a spring.

6. Nut system according to claim 5, wherein the spring is an elastic wire.

7. Nut system according to claim 5 wherein the spring is a cambered metal ring.

8. Nut system according to claim 1 wherein the elastic part is an elastomeric element.

9. Nut system according to claim 8, wherein the elastomeric element is a torus.

* * * * *